Oct. 15, 1963
D. W. WALKER
3,106,998
GRAIN DRILL CLUTCH
Filed Dec. 30, 1960
2 Sheets-Sheet 1
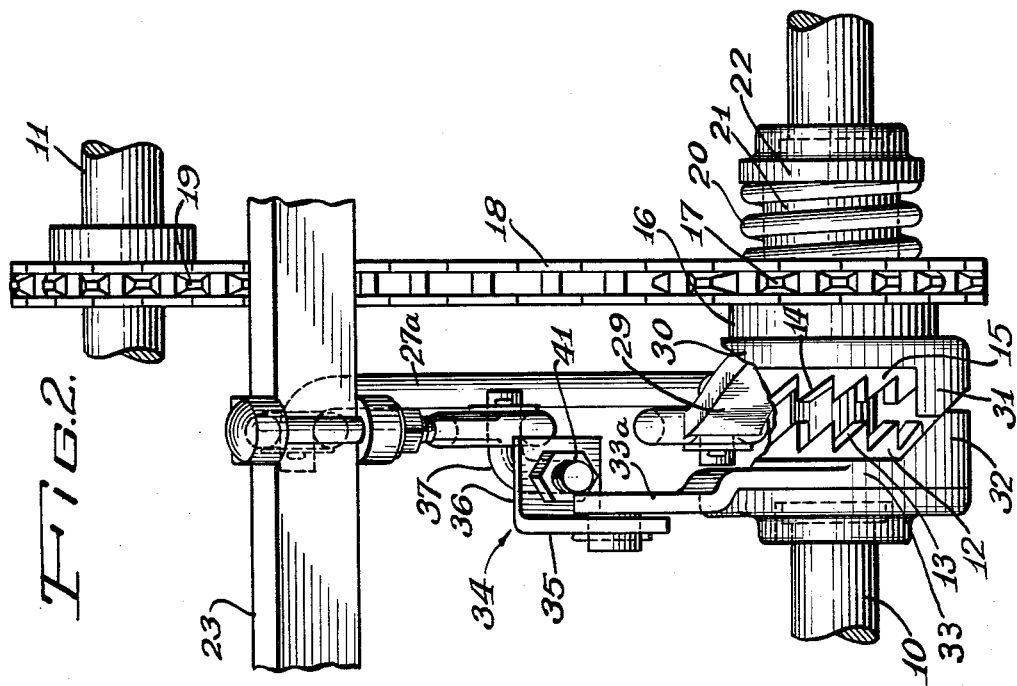
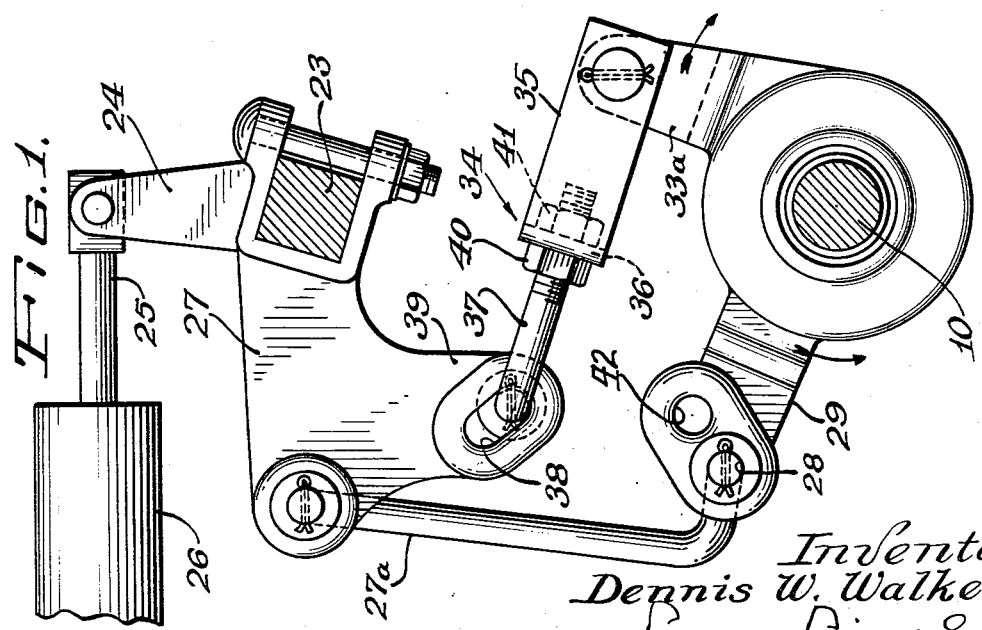
Inventor:
Dennis W. Walker
Paul O. Pierre
Atty.

Oct. 15, 1963  D. W. WALKER  3,106,998
GRAIN DRILL CLUTCH
Filed Dec. 30, 1960  2 Sheets-Sheet 2
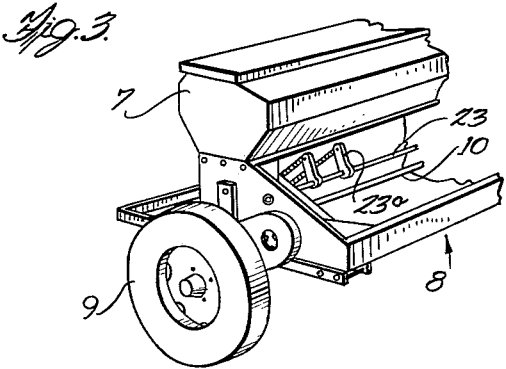
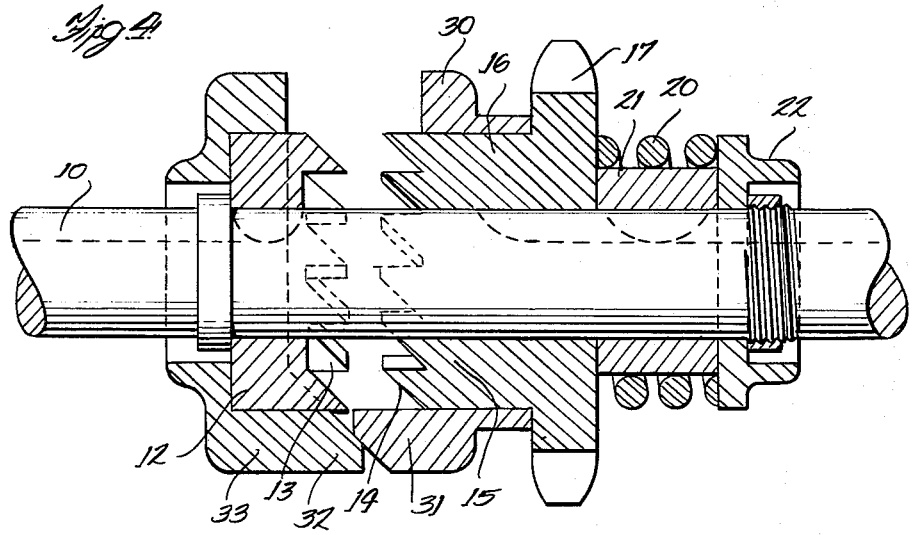
Inventor
Dennis W. Walker
Attorney

United States Patent Office 3,106,998
Patented Oct. 15, 1963

3,106,998
GRAIN DRILL CLUTCH
Dennis W. Walker, Ancaster, Ontario, Canada, assignor to International Harvester Company, Chicago, Ill., a corporation of New Jersey
Filed Dec. 30, 1960, Ser. No. 79,877
2 Claims. (Cl. 192—23)

This invention relates to agricultural implements and particularly to grain drills. More specifically, the invention concerns improved clutch mechanism for a grain drill or the like.

The invention has for its object the provision of improved means for controlling the engagement and disengagement of the parts of a clutch drivingly connecting certain implement parts, such as the seed or fertilizer dispensing apparatus which is customarily disengaged when the furrow forming devices are raised out of operating position.

In modern grain drills and the like, raising and lowering of the furrow formers is accomplished by the use of hydraulic cylinders which operate at a constant and relatively slow piston speed. The slow clutch engagement resulting from the actuation of the clutch parts through operation of the cylinder causes rapid wear of the clutch teeth. This difficulty is overcome by the present invention which has for another of its objects the provision of clutch operating mechanism which causes the clutch to engage rapidly although actuated by a slowly moving hydraulic cylinder.

According to this invention, a pair of toothed clutch elements are mounted on a drive shaft, one of the elements being rotatable with the shaft and the other being shiftable axially into and out of driving engagement therewith. A pair of cam members rotatably mounted on the clutch element have cam faces which cooperate to shift the clutch element and are provided with radial arms by which they may be rotated in opposite directions. This rocking of the arms in opposite directions is accomplished by connecting both arms by separate links to an arm mounted on the rock shaft which is rocked by the hydraulic cylinder, and a feature of this invention is the provision of a slotted connection of one of the links to the rock arm providing lost motion so that the shiftable clutch element can be shifted into engaged position independently of the operation of the hydraulic cylinder.

Other objects and advantages of the invention will become clear from the following detailed description when read in conjunction with the accompanying drawings wherein:

FIGURE 1 is a cross-sectional side elevation showing the parts of a grain drill with which this invention is concerned;

FIGURE 2 is a front elevation, with parts removed, and partly in section, of the structure shown in FIGURE 1;

FIGURE 3 is a perspective view showing a portion of a typical grain drill; and

FIGURE 4 is an enlarged sectional view of a portion of the structure shown in FIGURE 2.

The invention disclosed herein is designed for use on an agricultural implement such as a grain drill, and it may be understood that a conventional grain drill includes furrow opening tools, not shown, and an elongated hopper as indicated at 7 in FIGURE 3 from which seed is dispensed to the furrow formed by the furrow opening tools. It should be noted that the hopper 7 is mounted on a frame 8 supported by wheels 9, only one of which is shown, and the operating mechanism for an implement of this type includes a drive shaft 10 suitably driven by wheels 9, the driven feed shaft of this apparatus being indicated by the numeral 11.

It may be understood that shaft 10 is driven at a substantially constant rate of speed and has keyed thereto a driving clutch element 12 having teeth 13 thereon engageable with teeth 14 on a driven clutch element 15 which is mounted on the shaft 10 for rotation with respect thereto and for axial sliding movement relative thereto into and out of engagement with the teeth 13 of the driving clutch element 12.

Clutch element 15 includes a hub section 16 upon which is mounted a sprocket wheel 17 drivingly connected by a chain 18 with another sprocket wheel 19 mounted on the feed shaft 11.

In FIGURE 2 of the drawings the clutch elements 12 and 15 are shown in their disengaged position wherein drive is not being transmitted from shaft 10 to shaft 11. However, these clutch elements are urged toward operative engagement thereof by means of a coil spring 20 mounted at one end on a shoulder 21 of cap 22 which is secured to shaft 10, the other end of the spring fitting onto hub 16 to bias driven clutch element 15 toward engagement with the driving clutch element 12.

As pointed out hereinbefore, in order to avoid dispensing seed or the like when the furrow forming tools are raised to their transport position the clutch elements 12 and 15 are thrown out of engagement to the position shown in FIGURE 2 by mechanism hereinafter to be described. A rock shaft 23 forms a part of the operating apparatus of this invention and is connected by lift linkage 23a, to the furrow forming tools for raising and lowering them by the rocking of the shaft 23. Rocking of shaft 23 to raise and lower the tools is accomplished by the provision of a rock arm 24 mounted on the shaft and pivotally connected to a piston rod 25 slidable in a hydraulic cylinder 26 carried by the grain drill and supplied with fluid under pressure from any suitable and well known source, preferably from the tractive vehicle by which the machine is propelled over a field.

Also mounted on shaft 23 is a clutch operating lift arm 27 which extends rearwardly from rock shaft 23 and has pivotally and loosely connected thereto the upper end of a link 27a, the lower end of which is bent laterally for pivotal reception in an oversized opening 28 in the enlarged end of an arm 29 affixed to and projecting radially from the body of a cam member 30 mounted on driven clutch element 15 for rotation with respect thereto. Rocking shaft 23 by operation of the hydraulic cylinder 26 in a clockwise direction, as viewed in FIGURE 1 throws the clutch elements out of engagement to the position of FIGURES 2 and 4. This is accomplished by conventional means in the form of cam projections 31 on cam member 30 and a cooperating cam projection 32 on another cam member 33 rotatably mounted on the clutch element 12.

Cam member 33 has affixed thereto a radially extending arm 33a which is pivotally and loosely connected to one end of a link 34 comprising a bar 35 having a flange 36 apertured to slidably receive the threaded end of a rod 37, the other end of which is bent for loose pivotal reception in a slot 38 formed on a projection 39 on lift arm 27. A pair of nuts 40 and 41 are provided on threaded end of rod 37 and on opposite sides of the flange 36 so that the length of the link 34 can be adjusted as desired.

In the drawings the clutch parts are shown in their disengaged position, the driven clutch element 15 having been shifted axially out of engagement with the driving clutch element 12 by the camming action of the two members 31 and 32 upon rocking of the lift arm 27 in one direction, such movement being accommodated by the loose connections of links 27a and 34 to arms 27, 29 and 33a. This axial movement of the element 15 away from element 12 is against the bias of the coil spring 20 which constantly urges the clutch elements into engaged position.

Upon rocking the clutch lift arm 27 in a counterclockwise direction while the furrow forming units of the grain drill are being placed in operation, the cam members 30 and 33 are revolved in opposite directions with respect to each other, resulting in relative movement of the cam projections 31 and 32 into a position corresponding to the engaged position of the drive teeth 13 and 14 of the clutch elements. As the teeth 14 approach the teeth 13, they are permitted to become engaged suddenly at a greater rate of speed than is represented by the lifting action of the arm 27 through the provision of a lost motion connection represented by the pivotal mounting of the bent end of rod 37 in slot 38 of the lift arm 27. As the arms 29 and 33a of the cam members are rocked counterclockwise and clockwise respectively, as indicated by arrows in FIGURE 1, the slot 38 permits spring 20 to force cam member 30 into engagement with cam member 33, independently of the rocking of lift arm 27. Thus, wear and tear on the teeth 13 and 14 is substantially eliminated.

Fertilizer and grass seed are common attachments for grain drills, and when, for example, only one of these materials is to be sown, it is desirable to disengage the mechanism which drives the other dispensing devices to avoid unnecessary wear. The clutch parts controlling the operation of these other devices are disengaged and held in disengaged position throughout the operation of the machine, irrespective of the position of the rock shaft 23, by the provision of another opening 42 in the enlarged end of arm 29. The bent end of rod 37 is removed from slot 38 and inserted in opening 42. This moves the clutch elements out of engagement and holds them there.

It is believed that the novel clutch control apparatus of this invention will be clearly understood from the foregoing description. It should likewise be understood that the invention has been described in its preferred embodiment and that modifications may be made therein without departing from the spirit of the invention or the scope of the appended claims.

What is claimed is:
1. In an agricultural implement including a frame and a drive shaft, a clutch having driving and driven elements mounted on said shaft, one of said elements being axially shiftable to disengaged position, means biasing one of said elements to engagement with the other, control means for causing engagement and disengagement of the clutch elements including a rockable member mounted on the frame, and means operatively connecting said rockable member to said clutch elements to shift them between engaged and disengaged positions in response to rocking said rockable member, comprising a pair of cooperating cam members rotatably mounted on said clutch elements, a radial arm affixed to each of said cam members, a link connecting each of said arms to said rockable member at different locations thereon, the connection of one of said links to said rockable member including lost motion accommodating rotation of one of said cam members and therefore axial movement of one of said clutch elements independently of said rockable member, and means for optionally connecting said one of said links to the other of said radial arms to hold the clutch elements in fixed relation to each other.

2. The invention set forth in claim 1, wherein said lost motion connection includes a slot in the rockable member adapted to pivotally and slidably receive one end of said one of said links, and an opening is provided in said other radial arm to pivotally receive said end of said link.

References Cited in the file of this patent

UNITED STATES PATENTS

| | | |
|---|---|---|
| 795,808 | Armitage et al. | Aug. 1, 1905 |
| 1,250,297 | Ford | Dec. 18, 1917 |
| 2,104,580 | Brewer | Jan. 4, 1938 |
| 2,332,743 | Morris | Oct. 26, 1943 |
| 2,561,235 | Schmutzler | July 17, 1951 |
| 2,685,356 | Bjerkan | Aug. 3, 1954 |